US012639297B2

(12) United States Patent
Kulkarni et al.

(10) Patent No.: US 12,639,297 B2
(45) Date of Patent: May 26, 2026

(54) TECHNIQUES FOR GENERATING QUERY LANGUAGE QUERIES USING TEMPLATIZED QUERY PROMPTS

(71) Applicant: Microsoft Technology Licensing, LLC, Redmond, WA (US)

(72) Inventors: Sudhanshu Kulkarni, Bengaluru (IN); Yaswanth Sai Kamma, Bengaluru (IN); Ashis K. Roy, Redmond, WA (US); Preetika Shukla, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/644,730

(22) Filed: Apr. 24, 2024

(65) Prior Publication Data

US 2025/0335433 A1 Oct. 30, 2025

(51) Int. Cl.
*G06F 16/2452* (2019.01)
*G06F 16/25* (2019.01)

(52) U.S. Cl.
CPC ...... *G06F 16/24522* (2019.01); *G06F 16/252* (2019.01)

(58) Field of Classification Search
CPC ...................... G06F 16/24522; G06F 16/252
See application file for complete search history.

(56) References Cited

U.S. PATENT DOCUMENTS

| | | | |
|---|---|---|---|
| 2014/0095527 A1 | | 4/2014 | Mohania |
| 2022/0028378 A1* | | 1/2022 | Jones ................. G06F 16/9532 |
| 2022/0244952 A1* | | 8/2022 | Breslav ..................... G06F 8/33 |
| 2022/0292085 A1* | | 9/2022 | Shahriar ................ G06N 20/00 |
| 2022/0374605 A1* | | 11/2022 | Sethi ..................... G06T 19/006 |
| 2023/0097443 A1 | | 3/2023 | Lee et al. |
| 2023/0315722 A1* | | 10/2023 | Saxe ........................ H04L 63/20 726/1 |
| 2024/0355318 A1* | | 10/2024 | Beaver .................. G10L 15/063 |
| 2025/0173343 A1* | | 5/2025 | Perinchery ............ G06F 16/783 |
| 2025/0259005 A1* | | 8/2025 | Du .................... G06F 16/24522 |

OTHER PUBLICATIONS

Mishra, Natural language query formalization to SPARQL for querying knowledge bases using Rasa, pp. 193-206 (Year: 2022).*
Werir, DBPal: A Fully Pluggable NL2SQL Training Pipeline, pp. 1-15 (Year: 2020).*

(Continued)

*Primary Examiner* — Albert M Phillips, III

(74) *Attorney, Agent, or Firm* — ArentFox Schiff LLP

(57) ABSTRACT

Described are examples for converting a natural language input into a query language query. One or more placeholder names and one or more corresponding placeholder values can be extracted from the natural language input. The one or more corresponding placeholder values in the natural language input can be replaced with the one or more placeholder names. The natural language input having the one or more placeholder names can be matched to a templatized query prompt that includes the one or more placeholder names. The query language query can be generated at least in part by replacing the one or more placeholder names in the templatized query prompt with the one or more corresponding placeholder values.

14 Claims, 4 Drawing Sheets

(56)           References Cited

OTHER PUBLICATIONS

Dong, Data-Anonymous Encoding for Text-to-SQL Generation, pp. 5405-5414, Nov. 2019.*

Extended European Search Report received for EP Application No. 25169074.9, mailed on Sep. 10, 2025, 11 pages.

Anandika, et al.: "A Study on Machine Learning Approaches for Named Entity Recognition", 2019 International Conference on Applied Machine Learning (ICAML), IEEE, May 25, 2019 (May 25, 2019), pp. 153-159, XP033708489, DOI: 10.1109/ICAML48257. 2019.0037 [retrieved on Feb. 7, 2020] *the whole document*.

\* cited by examiner

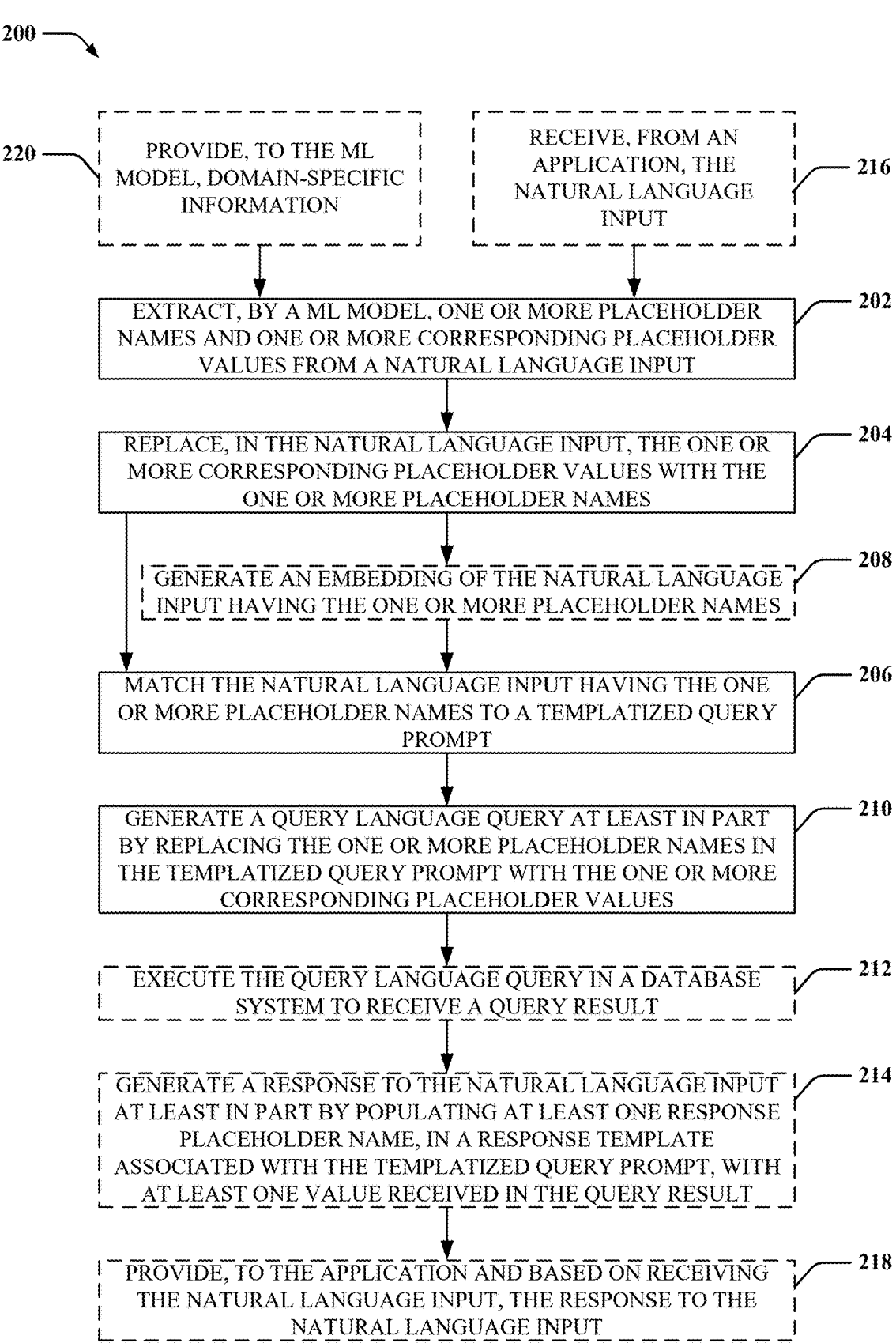

200 ⟍

220 — PROVIDE, TO THE ML MODEL, DOMAIN-SPECIFIC INFORMATION

RECEIVE, FROM AN APPLICATION, THE NATURAL LANGUAGE INPUT — 216

EXTRACT, BY A ML MODEL, ONE OR MORE PLACEHOLDER NAMES AND ONE OR MORE CORRESPONDING PLACEHOLDER VALUES FROM A NATURAL LANGUAGE INPUT — 202

REPLACE, IN THE NATURAL LANGUAGE INPUT, THE ONE OR MORE CORRESPONDING PLACEHOLDER VALUES WITH THE ONE OR MORE PLACEHOLDER NAMES — 204

GENERATE AN EMBEDDING OF THE NATURAL LANGUAGE INPUT HAVING THE ONE OR MORE PLACEHOLDER NAMES — 208

MATCH THE NATURAL LANGUAGE INPUT HAVING THE ONE OR MORE PLACEHOLDER NAMES TO A TEMPLATIZED QUERY PROMPT — 206

GENERATE A QUERY LANGUAGE QUERY AT LEAST IN PART BY REPLACING THE ONE OR MORE PLACEHOLDER NAMES IN THE TEMPLATIZED QUERY PROMPT WITH THE ONE OR MORE CORRESPONDING PLACEHOLDER VALUES — 210

EXECUTE THE QUERY LANGUAGE QUERY IN A DATABASE SYSTEM TO RECEIVE A QUERY RESULT — 212

GENERATE A RESPONSE TO THE NATURAL LANGUAGE INPUT AT LEAST IN PART BY POPULATING AT LEAST ONE RESPONSE PLACEHOLDER NAME, IN A RESPONSE TEMPLATE ASSOCIATED WITH THE TEMPLATIZED QUERY PROMPT, WITH AT LEAST ONE VALUE RECEIVED IN THE QUERY RESULT — 214

PROVIDE, TO THE APPLICATION AND BASED ON RECEIVING THE NATURAL LANGUAGE INPUT, THE RESPONSE TO THE NATURAL LANGUAGE INPUT — 218

Figure 2

TECHNIQUES FOR GENERATING QUERY LANGUAGE QUERIES USING TEMPLATIZED QUERY PROMPTS

BACKGROUND

Large language models (LLM) in machine learning (ML) can generate text and perform various language-related tasks. Transforming natural language into a structured data retrieval query is a specific task that involves converting natural language questions into structured query language (SQL) queries or application programming interface (API) requests, such as graph query language (GQL), representational state transfer (Rest), etc., The generated queries can then be executed against databases or API servers to retrieve the data. Once data is retrieved, LLM can also be used to summarize or format the data into text or visual format before returning the resulting data to the user or application.

Though useful, LLM presents various challenges while performing these operations including performance issues, cost issues, accuracy issues, and the like. For example, natural language to query generation using LLM can require an undesirable amount of time (e.g., depending on processing resources). Similarly, summarization and/or formatting of data output through LLM can require additional time. This can adversely affect the performance of Chat scenarios. In addition, depending on the size of subject entity for which query or API is being generated, LLM token requirement could be large, which may result in high cost to serve. In addition, further summarization and/or formatting of the data post query execution may require additional tokens. In addition, to generate an accurate query for a natural language input question (prompt), LLM may be required to have good understanding of underlying domain of the entity for which query is being generated. Some techniques exist to improve accuracy of the resulting query, such as retrieval augmented generation (RAG), other types of fine tuning, etc., but at a cost of other overheads (e.g., expensive data engineering and/or ML operations). Also based on the nature of input prompt, an output query may be too complex to be generated using LLM.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a device for converting a natural language input into a query language query is provided. The device includes one or more memories storing instructions, and one or more processors coupled to the one or more memories. The one or more processors are configured to execute the instructions to extract, by a machine learning (ML) model, one or more placeholder names and one or more corresponding placeholder values from the natural language input, generate a templatized natural language input at least in part by replacing, in the natural language input, the one or more corresponding placeholder values with the one or more corresponding placeholder names, match the templatized natural language input to a templatized query prompt that includes the one or more placeholder names, and generate the query language query at least in part by replacing the one or more placeholder names in the templatized query prompt with the one or more corresponding placeholder values.

In another example, a computer-implemented method for converting a natural language input into a query language query is provided. The method includes receiving, from an application, the natural language input, extracting, by a ML model, one or more placeholder names and one or more corresponding placeholder values from the natural language input, replacing, in the natural language input, the one or more corresponding placeholder values with the one or more placeholder names, matching the natural language input having the one or more placeholder names to a templatized query prompt that includes the one or more placeholder names, generating the query language query at least in part by replacing the one or more placeholder names in the templatized query prompt with the one or more corresponding placeholder values, and returning, to the application and based on receiving the natural language input, a response to the natural language input, wherein the response is based on a response template associated with the templatized query prompt.

In another example, a non-transitory computer-readable medium storing instructions thereon is provided where the instructions, when executed by at least one computing device, cause the at least one computing device to perform operations for converting a natural language input into a query language query. The operations comprise extracting, by a ML model and based on a request including the natural language input and domain specific placeholder names provided to the ML model, one or more placeholder names and one or more corresponding placeholder values from the natural language input, replacing, in the natural language input, the one or more corresponding placeholder values with the one or more placeholder names, matching the natural language input having the one or more placeholder names to a templatized query prompt that includes the one or more placeholder names, and generating the query language query at least in part by replacing the one or more placeholder names in the templatized query prompt with the one or more corresponding placeholder values.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2 is a flow diagram of an example of a method for generating query language queries from natural language input, in accordance with aspects described herein.

DETAILED DESCRIPTION

Figure 1:
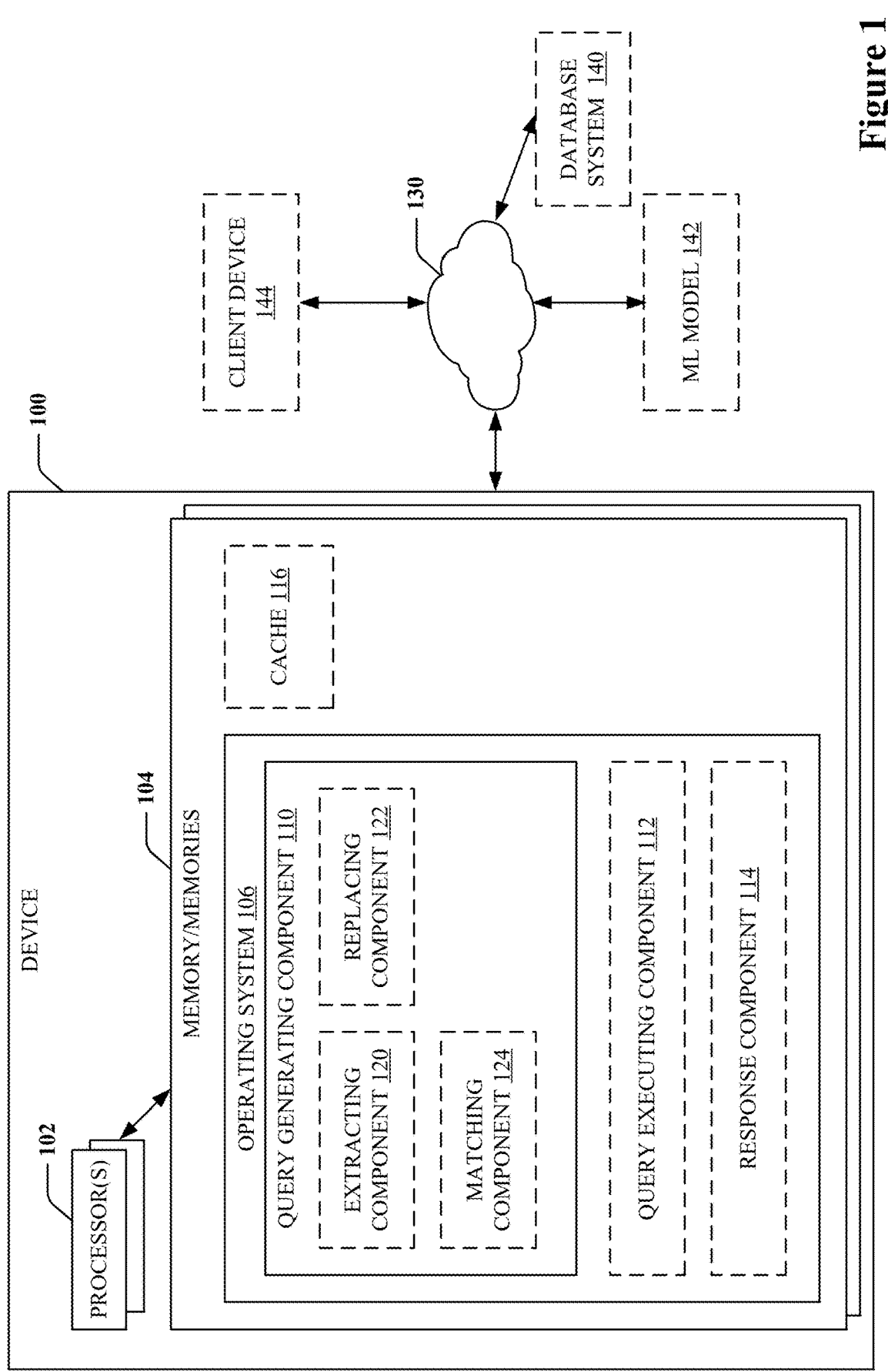
FIG. 1 is a schematic diagram of an example of a device for performing functions related to generating query language queries from natural language input, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to generating query language queries using templatized prompts. For example, templatized query prompts, and/or corresponding response templates, can be stored in a cache. The templatized query prompts can include query language syntax along with one or more placeholder names for one or more placeholder values that can be extracted from a natural language prompt (e.g., question). Given a natural language prompt, the one or more placeholder values can be replaced with one or more placeholder names (e.g., using a machine learning (ML) model to detect and replace the values with names). This generated natural language prompt having the one or more placeholder names can be used to determine a corresponding templatized query prompt from the cache. Parameters in the templatized query prompt can be populated with the one or more placeholder values to generate the query language query.

In one example, the query language query can be executed against a database or API server using the native query language. In an example, the templatized query prompt can also have an associated response template. Values from the query response can be populated in the associated response template, which may include text, a visualization or chart, etc., and the populated query response can be provided to a user or application. In accordance with aspects described herein, using a ML model, such as a large language models (LLM), for the limited purposes of obtaining placeholder name/value pairs from the natural language input and/or matching the natural language input having placeholder names to a templatized query prompt can improve performance, token cost, and accuracy of generating the query language query as compared to using LLM for the entire process. In addition, as the limited purposes of using the LLM in this regard may be less complex, a less sophisticated (and thus possibly more efficient) LLM may be used for the limited purposes of the query generation described herein, which may reduce query cost.

Turning now to FIGS. 1-4, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

FIG. 1 is a schematic diagram of an example of a device 100 (e.g., a computing device) for performing functions related to generating query language queries from natural language input, in accordance with aspects described herein. In an example, device 100 can include one or more processors 102 and/or memory/memories 104 configured to execute or store instructions or other parameters related to providing an operating system 106, which can execute one or more applications or processes. For example, processor(s) 102 and memory/memories 104 may be separate components communicatively coupled by a bus (e.g., on a motherboard or other portion of a computing device, on an integrated circuit, such as a system on a chip (SoC), etc.), components integrated within one another (e.g., processor(s) 102 can include the memory/memories 104 as an on-board component), and/or the like. Memory/memories 104 may store instructions, parameters, data structures, etc. for use/ execution by processor(s) 102 to perform functions described herein. In another example, processor(s) 102 and/or memory/memories 104 can be distributed over multiple devices or physical computing nodes in a network (e.g., in a cloud-based computing platform) for providing the functions of the various components described herein.

In one example, the operating system 106 can execute one or more applications or processes, such as, but not limited to, a query generating component 110 for generating a query language query from a natural language query, a query executing component 112 for executing the query language query against one or more databases, and/or a response component 114 for generating a response based on a query result of executing the query language query. In an example, memory/memories 104 can include a cache 116 of templatized query prompts and/or corresponding response templates, as described further herein. In an example, the components 110, 112, and/or 114, and/or the cache 116, can be included in, or implemented by, the device 100 and/or in other devices (e.g., in a cloud-computing environment or cloud-based computing platform), but are described herein as provided by the device 100 for ease of explanation. Indeed, in some examples, device 100 can be provided by multiple devices or nodes of a cloud-based computing platform.

In an example, query generating component 110 can optionally include an extracting component 120 for extracting one or more placeholder name and value pairs from a received natural language input, a replacing component 122 for replacing the one or more placeholder values in the natural language input with the one or more placeholder names, and/or a matching component 124 for matching a templatized query prompt, e.g., from cache 116, that corresponds to (e.g., is most correlated with) the natural language input having the one or more placeholder names. In an example, device 100 can communicate with one or more other nodes or devices over a network 130, which can include one or more network connections, the Internet, etc. For example, device 100 can communicate with a database system 140 for executing a query language query and/or receiving a query result, a ML model 142 for extracting placeholder name/value pair(s) from the natural language input, etc., and/or a client device 144 for receiving the natural language input and/or providing an associated response thereto. For example, ML model 142 may include a LLM or other ML model that is trained on certain data, can receive input data, and can provide output data based on the training data or inferences therefrom.

FIG. 2 is a flowchart of an example of a method 200 for generating query language queries from natural language input, in accordance with aspects described herein. For example, method 200 can be performed by a device 100 and/or one or more components thereof to facilitate generating query language queries and/or associated responses based on response templates, as described herein.

In method 200, at action 202, given a natural language input, one or more placeholder names and/or one or more corresponding placeholder values can be extracted from the natural language input by a ML model. In an example, extracting component 120, e.g., in conjunction with processor(s) 102, memory/memories 104, operating system 106, query generating component 110, etc., can extract, by a ML model (e.g., ML model 142, one or more placeholder names and one or more corresponding placeholder values from the natural language input. For example, given the natural language input, extracting component 120 can use the ML model 142 to extract one or more placeholder name/value pairs from the natural language input, which can include inferring which words in the natural language input are parameters that can be used in a query, determining a name or type of the words, and/or associating the placeholder name with the value indicated in the input or a different value that can be generated based on the natural language input. In specific examples described further herein, ML model 142 can extract a placeholder name for a time range, but may modify the placeholder value based on the corresponding language in the natural language input (e.g., the placeholder value for "Last 6 months" returned by the ML model 142 may be an actual date range).

For example, given a natural language input "Show me revenue for Company1 in Southeast Asia for Last 6 months," extracting component 120 can extract, by providing the natural language input to ML model 142, placeholder names {$Company}, {$Region}, and {$Time Frame}, and associated values "Company1," "Southeast Asia," and "Last 6 Months." Other natural language inputs may result in similar placeholder names being extracted by the ML model 142. For example, given natural language input "How does revenue look for Company2 in Western Europe for Calendar Year 2023," extracting component 120 can extract, by providing the natural language input to ML model 142, placeholder names {$Company}, {$Region}, and {$Time Frame}, and associated values "Company2," "Western Europe," and "Calendar Year 2023." Or, for example, given natural language input "For last quarter tell me revenue for Company3 in the US," extracting component 120 can extract, by providing the natural language input to ML model 142, placeholder names {$Company}, {$Region}, and {$Time Frame}, and associated values "Company3," "US," and "last quarter."

For example, the ML model 142 can be trained with natural language inputs and associated outputs of placeholder names. In this regard, for example, extracting component 120 can provide the natural language input to the ML model 142 and can receive a list of one or more placeholder names and/or values from the natural language input that were detected as corresponding to the placeholder names. In one example, the placeholder names can be specific to a certain domain, and the ML model 142 can be trained with the domain-specific placeholder names or other information, as described further herein. In any case, for example, the placeholder names can be domain-specific terms or parameters that may have a value detected from the natural language input. The term or parameter may not appear in the natural language input, but the ML model 142 can associate certain words to the domain-specific terms or parameter to determine and provide the placeholder name and associated value from the input.

In method 200, at action 204, the one or more corresponding placeholder values can be replaced with the one or more placeholder names in the natural language input. In an example, replacing component 122, e.g., in conjunction with processor(s) 102, memory/memories 104, operating system 106, query generating component 110, etc., can replace, in the natural language input, the one or more corresponding placeholder values with the one or more placeholder names. For example, replacing component 122 can receive the placeholder names and corresponding placeholder values from the ML model 142, and can replace, in the natural language, the placeholder values with the placeholder names to generate a more generic, or templatized, natural language input for potentially matching to a templatized query prompt. For example, a templatized natural language input may have words (e.g., of a sentence) but may include parameter names where corresponding values were present to generalize the intention of the input e.g., for the purposes of locating a templatized query prompt. For example, the templatized natural language input can be generated by substituting detected parameter values (e.g., placeholder values) with associated parameter names (e.g., placeholder names). In the examples above, replacing component 122 may replace placeholder values with placeholder names to generate the more generic, or templatized, inputs of "Show me revenue for {$Company} in {$Region} for {$Time Frame}," or "How does revenue look for {$Company} in {$Region} for {$Time Frame}," or "For {$Time Frame} tell me revenue for {$Company} in the {$Region}."

In method 200, at action 206, the natural language input having the one or more placeholder names can be matched to a templatized query prompt. In an example, matching component 124, e.g., in conjunction with processor(s) 102, memory/memories 104, operating system 106, query generating component 110, etc., can match the natural language input having the one or more placeholder names, to a templatized query prompt. For example, the templatized query prompt can be in the syntax or format of the query language, but can include at least a portion of the placeholder names from the natural language input having the one or more placeholder names. For example, given the more generic, or templatized, inputs above, e.g., "Show me revenue for {$Company} in {$Region} for {$Time Frame}," or "How does revenue look for {$Company} in {$Region} for {$Time Frame}," or "For {$Time Frame} tell me revenue for {$Company} in the {$Region}," matching component 124 may match these inputs to the same templatized query prompt: Revenue {$Company} {$Region} {$Time Frame}.

In an example, cache 116 can include the templatized query prompts, and matching component 124 can perform a vector search of the more generic, or templatized, natural language inputs (with placeholder names instead of values) on the templatized query prompts to detect a match. For example, matching component 124 can determine, based on the vector search, a templatized query prompt with a highest correlation score for the input (and/or that the correlation score achieves a matching threshold). Using a vector search with a limited set of results, in this regard, can save time and/or processing resources over using LLM to compute the query for the natural language input. In addition, in some examples as described, at least some of the templatized query prompts may have associated response templates, and as such, matching component 124 can also match or obtain the response template for the matched templatized query prompt for using with the query result.

In method 200, optionally at action 208, an embedding of the natural language input having the one or more placeholder names can be generated. In an example, matching component 124, e.g., in conjunction with processor(s) 102, memory/memories 104, operating system 106, query generating component 110, etc., can generate (e.g., by using ML model 142) the embedding of the natural language input having the one or more placeholder names. For example, matching component 124 can generate the embedding based on calling an embedding model (e.g., text-embedding-ada-002) with the natural language input having the one or more placeholder names. In this example, matching component 124 can match the embedding to the templatized query prompt using the vector search. For example, the vector database generated by the embedding model can include possible strings of natural language input having the one or more placeholder names, each of which can be stored as arrays of decimal numbers that represent the string. In this example, matching component 124 can call the embedding model with the templatized query prompt to obtain a natural language input having the one or more placeholder names, which can be based on searching the vector database for a string (or vector) having a similar score or decimal number as the templatized query prompt.

In method 200, at action 210, a query language query can be generated at least in part by replacing the one or more placeholder names in the templatized query prompt with the one or more corresponding placeholder values. In an example, query generating component 110, e.g., in conjunction with processor(s) 102, memory/memories 104, operating system 106, etc., can generate the query language query at least in part by replacing the one or more placeholder names in the templatized query prompt with the one or more corresponding placeholder values. In this regard, for example, query generating component 110 can convert the natural language input to the query language query. For example, query generating component 110 can populate the one or more placeholder names in the templatized query prompt with the placeholder values that are matched to the placeholder names (e.g., based on the output received from ML model 142 by extracting component 120 in Action 202). For instance, in the examples above, for the natural language input "Show me revenue for Company1 in Southeast Asia for Last 6 months," query generating component 110 can replace the placeholder names in the templatized query prompt "Revenue {$Company} {$Region} {$Time Frame}" with the placeholder values to generate the query language query: "Revenue "Company1" "Southeast Asia" "Last 6 Months"." This query language query can be in a syntax of a desired query language output, such as a SQL query, an API, etc., as described above.

In method 200, optionally at action 212, the query language query can be executed in a database system to receive a query result. In an example, query executing component 112, e.g., in conjunction with processor(s) 102, memory/memories 104, operating system 106, etc., can execute the query language query in a database system (e.g., database system 140) to receive the query result from the database system. For example, the database system 140 can provide a query execution environment, an API, etc. to allow database query execution, and query executing component 112 can accordingly provide the query language query to the database system 140 for execution, and can obtain the query result therefrom.

In method 200, optionally at action 214, a response to the natural language input can be generated at least in part by populating at least one response placeholder name, in a response template associated with the templatized query prompt, with at least one value received in the query result. In an example, response component 114, e.g., in conjunction with processor(s) 102, memory/memories 104, operating system 106, etc., can generate the response to the natural language input at least in part by populating at least one response placeholder name, in the response template associated with the templatized query prompt, with at least one value received in the query result.

As described, for example, the templatized query prompt can be associated with one or more response templates (e.g., in cache 116), which may include one or more placeholder names. For example, the response template can be a text response, a chart or other visualization, etc. For example, the query result can include one or more name/value pairs, and the response component 114 can match the name of one or more name/value pairs in the query result with a placeholder name in the response template, and can replate the placeholder name with the corresponding value.

In method 200, optionally at action 216, the natural language input can be received from an application. In an example, query executing component 112, e.g., in conjunction with processor(s) 102, memory/memories 104, operating system 106, etc., can receive, from the application, the natural language input. In an example, query generating component 110 can receive the natural language input from a plug-in executing on the device 100, which can receive the natural language input from one or more client devices 144 executing one or more applications. For example, query executing component 112 may provide an API that can be accessed via the plug-in or otherwise to provide the natural language input and receive a response thereto.

In this regard, in an example, in method 200, optionally at action 218, the response to the natural language input can be provided to the application based on receiving the natural language input. In an example, response component 114, e.g., in conjunction with processor(s) 102, memory/memories 104, operating system 106, etc., can provide, to the application (e.g., via the plug-in) and based on receiving the natural language input, the response to the natural language input (e.g., as generated in Action 214).

In method 200, optionally at action 220, domain-specific information can be provided to the ML model. In an example, query generating component 110, e.g., in conjunction with processor(s) 102, memory/memories 104, operating system 106, etc., can provide, to the ML model (e.g., ML model 142), the domain-specific information. In an example, query generating component 110 can provide the domain-specific information to the ML model with a request including the natural language input to extract the one or more placeholder names and/or one or more corresponding placeholder values (e.g., at Action 202). The ML model can use this domain-specific information to extract the one or more placeholder name/value pairs, as described above. In one example, domain-specific information may include certain instructions such as: "for extracting $Time Range from the input question, fiscal/financial year starts on July 1st of the previous year and ends on June 30th of this year," or "the current quarter depends on today's date. For example, if today's month is January, February, or March 2024, then 'current quarter' is 20240101-20240331." This may assist the ML model in extracting the placeholder names and providing domain-specific placeholder values (e.g., in Action 202 described above).

Figure 3:
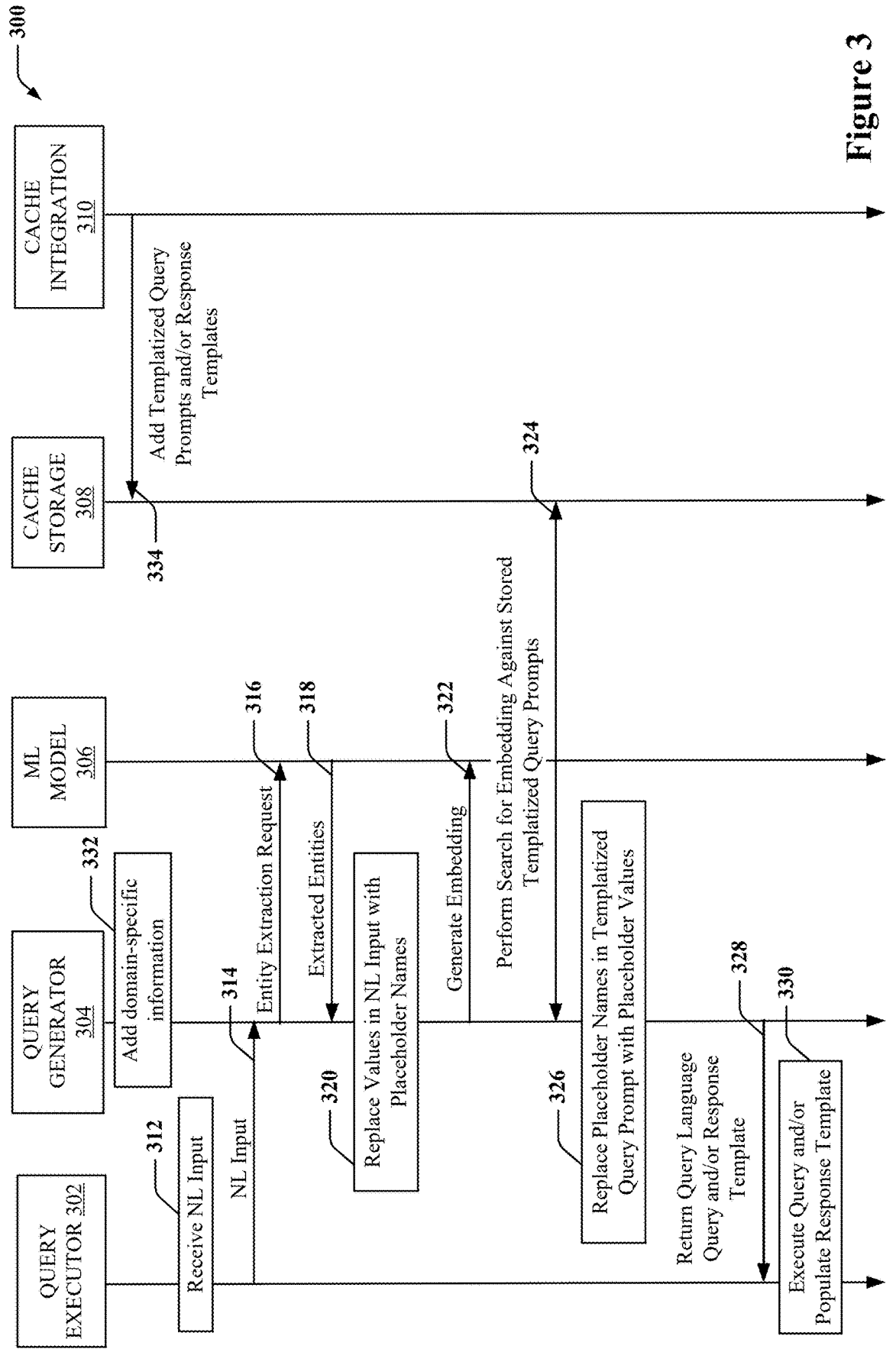
FIG. 3 illustrates an example of a call flow 300 between various nodes or processes to generate a query language query from natural language input, in accordance with aspects described herein.

FIG. 3 illustrates an example of a call flow 300 between various nodes or processes to generate a query language query from natural language input, in accordance with aspects described herein. The various nodes or processes can include a query executor 302, which can include a query executing component 112, a response component 114, or a device configured to execute a query executing component 112 or response component 114, as described herein. The nodes or processes can also include a query generator 304, which can include query generating component 110 or a device configured to execute a query generating component 110, a ML model 306, which may include ML model 142, a cache storage 308, which may include cache 116, and/or a cache integration process 310, which may execute on a device such as device 100 or client device 144.

At 312, query executor 302 can receive a natural language (NL) input. For example, query executor 302 may provide an API or plug-in by which the query executor 302 may receive the NL input from an application. As described, the NL input may be a sentence or question that can be interpreted as a query for data in a database system. Query executor 302 can provide the ML input to the query generator 304 at 314 for generating a query language query for executing by a query processor of a database system, an API, etc. Query generator 304 can include a semantic prompt cache that can have a list of placeholder names, which may be specific for a deployment of the query generator 304. In an example, query generator 304 can provide, as input to the ML model 306, the list of placeholder names and the NL input at 316.

In accordance with aspects described herein, ML model 306 can perform ML modeling based on trained data and/or the provided list of possible placeholder names to extract one or more placeholder names and corresponding placeholder values from the NL input. ML model 306 can provide the extracted entities (e.g., placeholder names and/or values) to the query generator 304 at 318. As described, for example, at 320, query generator 304 can replace values in the NL input with placeholder names at 320 to create a more generic, or templatized, NL input for locating a matching templatized query prompt. In addition, for example, at 322, an embedding of the NL input with placeholder names can be generated, and at 324, a search can be performed over cache storage 308 for templatized query prompts based on the embedding.

In an example, query generator 304 can locate, in cache storage 308, a templatized query prompt that matches the embedding. In one example, query generator 304 can perform a vector search for the generated embedding and can find a templatized query prompt that matches the embedding (e.g., with a highest correlation value and/or having a correlation value that achieves a threshold indicating a valid match). Query generator 304 can replace placeholder names, or other parameter indicators, in the templatized query prompt with placeholder values at 326 to generate the query language query. At 328, the query language query can be returned to the query executor 302 for execution against a database system or API. In addition, at 328, a response template associated with the query language query may be returned to the query executor 302. At 330, the query executor 302 can accordingly execute the query (e.g., against the database using the query language, in an API using a desired syntax, etc., as described in detail herein). In addition, at 330, the query executor 302 may populate a response template with a query result from executing the query, which may include replacing a placeholder name or other parameter in the response template with one or more values from the query result, as described.

In addition, in an example, at 332, domain-specific information can be added to the query generator 304 to facilitate providing domain-specific terms or other information to the ML model 306 with the NL input at 316 to influence the ML model 306 to consider domain-specific terms or information in generating the placeholder names and/or values. In another example, at 334, templatized query prompts and/or response templates can be added to the cache storage 308. For example, the templatized query prompts and/or response templates can be deployment specific and can be added by an administrator or other entity to allow for performing the vector search over the desired query prompts and/or response templates at 324.

Figure 4:
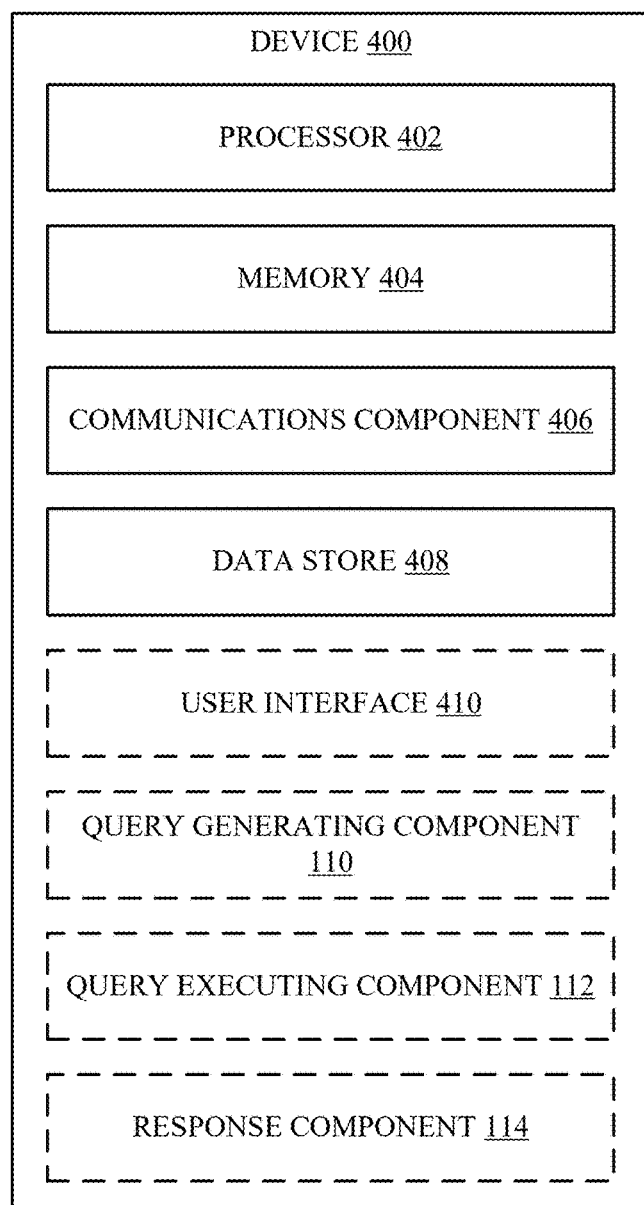
FIG. 4 is a schematic diagram of an example of a device for performing functions described herein, in accordance with aspects described herein.

FIG. 4 illustrates an example of device 400 including additional optional component details as those shown in FIG. 1. In one aspect, device 400 may include processor 402, which may be similar to processor(s) 102 for carrying out processing functions associated with one or more of components and functions described herein. Processor 402 can include a single or multiple set of processors or multi-core processors. Moreover, processor 402 can be implemented as an integrated processing system and/or a distributed processing system.

Device 400 may further include memory 404, which may be similar to memory/memories 104 such as for storing local versions of operating systems (or components thereof) and/or applications being executed by processor 402, such as a query generating component 110, query executing component 112, response component 114, etc. Memory 404 can include a type of memory usable by a computer, such as random access memory (RAM), read only memory (ROM), tapes, magnetic discs, optical discs, volatile memory, non-volatile memory, and any combination thereof.

Further, device 400 may include a communications component 406 that provides for establishing and maintaining communications with one or more other devices, parties, entities, etc. utilizing hardware, software, and services as described herein. Communications component 406 may carry communications between components on device 400, as well as between device 400 and external devices, such as devices located across a communications network and/or devices serially or locally connected to device 400. For example, communications component 406 may include one or more buses, and may further include transmit chain components and receive chain components associated with a wireless or wired transmitter and receiver, respectively, operable for interfacing with external devices.

Additionally, device 400 may include a data store 408, which can be any suitable combination of hardware and/or software, that provides for mass storage of information, databases, and programs employed in connection with aspects described herein. For example, data store 408 may be or may include a data repository for operating systems (or components thereof), applications, related parameters, etc.) not currently being executed by processor 402. In addition, data store 408 may be a data repository for query generating component 110, query executing component 112, response component 114, and/or one or more other components of the device 400.

Device 400 may optionally include a user interface component 410 operable to receive inputs from a user of device 400 and further operable to generate outputs for presentation to the user. User interface component 410 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly included and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A device for converting a natural language input into a query language query, comprising:

one or more memories storing instructions; and one or more processors coupled to the one or more memories and configured to execute the instructions to:

receive, from an application, a natural language input;

extract, by a machine learning (ML) model, one or more placeholder names and one or more corresponding placeholder values from the natural language input;

generate a templatized natural language input at least in part by replacing, in the natural language input, the one or more corresponding placeholder values with the one or more placeholder names;

generate an embedding of the templatized natural language input as an array of numbers that represent a string of the templatized natural language input;

match the templatized natural language input to a templatized query prompt that includes the one or more placeholder names at least in part by performing a vector search for the embedding against embeddings of multiple templatized query prompts stored in a storage, wherein the storage stores, for each of the multiple templatized query prompts, an associated response template of multiple response templates;

generate the query language query at least in part by replacing the one or more placeholder names in the templatized query prompt with the one or more corresponding placeholder values;

execute the query language query in a database system;

receive a query result of the query language query from the database system;

generate a response to the natural language input at least in part by populating at least one response placeholder name in the associated response template with at least one value received in the query result; and return, to the application and based on receiving the natural language input, the response.

2. The device of claim 1, wherein the one or more processors are configured to execute the instructions to generate, by the ML model or another ML model, the embedding of the natural language input having the one or more placeholder names.

3. The device of claim 1, wherein the one or more processors are configured to execute the instructions to provide, to the ML model, domain-specific information associated with the one or more placeholder names or the one or more corresponding placeholder values.

4. The device of claim 1, wherein the one or more processors are configured to execute the instructions to extract the one or more placeholder names and the one or more corresponding placeholder values at least in part by providing, to the ML model, the natural language input and a set of domain-specific placeholder names.

5. A computer-implemented method for converting a natural language input into a query language query, comprising:

receiving, from an application, the natural language input;

extracting, by a machine learning (ML) model, one or more placeholder names and one or more corresponding placeholder values from the natural language input;

replacing, in the natural language input, the one or more corresponding placeholder values with the one or more placeholder names to generate a templatized natural language input;

generating an embedding of the templatized natural language input as an array of numbers that represent a string of the templatized natural language input;

matching the templatized natural language input having the one or more placeholder names to a templatized query prompt that includes the one or more placeholder names at least in part by performing a vector search for the embedding against embeddings of multiple templatized query prompts stored in a storage, wherein the storage stores, for each of the multiple templatized query prompts, an associated response template of multiple response templates;

generating the query language query at least in part by replacing the one or more placeholder names in the templatized query prompt with the one or more corresponding placeholder values;

executing the query language query in a database system;

receiving a query result of the query language query from the database system; and returning, to the application and based on receiving the natural language input, a response to the natural language input, wherein the response is based on the associated response template stored for the templatized query prompt.

6. The computer-implemented method of claim 5, further comprising generating the response to the natural language input at least in part by populating at least one response placeholder name in the associated response template with at least one value received in the query result.

7. The computer-implemented method of claim 5, further comprising generating, by the ML model or another ML model, the embedding of the natural language input.

8. The computer-implemented method of claim 5, further comprising providing, to the ML model, domain-specific information associated with the one or more placeholder names or the one or more corresponding placeholder values.

9. The computer-implemented method of claim 5, wherein extracting the one or more placeholder names and the one or more corresponding placeholder values includes:

providing, as input to the ML model, the natural language input and a set of domain-specific placeholder names; and receiving, as output from the ML model, the one or more placeholder names and the one or more corresponding placeholder values.

10. A non-transitory computer-readable medium storing instructions thereon that, when executed by at least one computing device, cause the at least one computing device to perform operations for converting a natural language input into a query language query, comprising:

receiving, from an application, the natural language input;

extracting, by a machine learning (ML) model and based on a request including the natural language input and domain specific placeholder names provided to the ML model, one or more placeholder names and one or more corresponding placeholder values from the natural language input;

replacing, in the natural language input, the one or more corresponding placeholder values with the one or more placeholder names to generate a templatized natural language input;

generating an embedding of the templatized natural language input as an array of numbers that represent a string of the templatized natural language input;

matching the natural language input having the one or more placeholder names to a templatized query prompt that includes the one or more placeholder names at least in part by performing a vector search for the embedding against embeddings of multiple templatized query prompts stored in a storage, wherein the storage stores, for each of the multiple templatized query prompts, an associated response template of multiple response templates;

generating the query language query at least in part by replacing the one or more placeholder names in the templatized query prompt with the one or more corresponding placeholder values;

executing the query language query in a database system;

receiving a query result of the query language query from the database system;

generating a response to the natural language input at least in part by populating at least one response placeholder name in the associated response template with at least one value received in the query result; and returning, to the application and based on receiving the natural language input, the response.

11. The non-transitory computer-readable medium of claim 10, wherein the operations further comprise providing, to the ML model, domain-specific information associated with the one or more placeholder names or the one or more corresponding placeholder values.

12. The non-transitory computer-readable medium of claim 10, wherein the operations further comprise generating the response to the natural language input at least in part by populating at least one response placeholder name in the associated response template with at least one value received in the query result.

13. The non-transitory computer-readable medium of claim 10, wherein the operations further comprise generating, by the ML model or another ML model, the embedding of the natural language input.

14. The non-transitory computer-readable medium of claim 10, wherein the code for extracting the one or more placeholder names and the one or more corresponding placeholder values includes code for:

providing, as input to the ML model, the natural language input and a set of domain-specific placeholder names; and receiving, as output from the ML model, the one or more placeholder names and the one or more corresponding placeholder values.

* * * * *